US005712346A

United States Patent [19]

Lee

[11] Patent Number: 5,712,346
[45] Date of Patent: Jan. 27, 1998

[54] ACRYLIC EMULSION COATINGS

[75] Inventor: Ivan Lee, Arcadia, Calif.

[73] Assignee: Avery Dennison Corporation, Pasadena, Calif.

[21] Appl. No.: 486,948

[22] Filed: Jun. 7, 1995

Related U.S. Application Data

[63] Continuation-in-part of Ser. No. 389,571, Feb. 14, 1995.

[51] Int. Cl.$^6$ ................................. C08F 565/00
[52] U.S. Cl. ............... 525/288; 523/201; 524/460; 524/547; 524/806; 524/501; 524/521; 525/262; 525/902; 526/279
[58] Field of Search .................. 525/100, 209, 525/479, 262, 288, 902; 524/521, 460, 547, 806, 501; 526/279; 523/201

[56] References Cited

U.S. PATENT DOCUMENTS

| 3,025,403 | 3/1962 | Belknap et al. | 250/108 |
|---|---|---|---|
| 3,185,751 | 5/1965 | Sutton | 264/301 |
| 3,286,011 | 11/1966 | Kavalir et al. | 264/306 |
| 3,411,982 | 11/1968 | Kavalir et al. | 161/242 |
| 3,813,695 | 6/1974 | Podell, Jr. et al. | 2/168 |
| 3,856,561 | 12/1974 | Esemplare et al. | 117/139 |
| 3,933,702 | 1/1976 | Caimi et al. | 260/17 R |
| 4,302,852 | 12/1981 | Joung | 2/167 |
| 4,304,008 | 12/1981 | Joung | 2/167 |
| 4,310,928 | 1/1982 | Joung | 2/161 |
| 4,752,639 | 6/1988 | Heller et al. | 525/66 |
| 4,826,907 | 5/1989 | Murao et al. | 524/394 |
| 4,994,538 | 2/1991 | Lee | 526/279 |
| 5,069,965 | 12/1991 | Esemplare | 428/330 |
| 5,084,514 | 1/1992 | Szczechura et al. | 525/123 |
| 5,171,809 | 12/1992 | Hilty et al. | 526/279 |
| 5,214,095 | 5/1993 | Lavoie | 524/806 |
| 5,216,057 | 6/1993 | Pratt et al. | 524/269 |
| 5,234,736 | 8/1993 | Lee | 428/42 |
| 5,306,558 | 4/1994 | Takahashi et al. | 428/331 |

FOREIGN PATENT DOCUMENTS

| 0640023 | 11/1991 | European Pat. Off. . |
| 0455323 | 3/1995 | European Pat. Off. . |

OTHER PUBLICATIONS

J.S. Sadowski B. Martin and D.D. Gerst; *Polyurethane Latexes for Coagulation Dipping;* Aug. 1978; pp. 14–17.
Russell D. Culp and Bradley L. Pugh; *Natural Rubber Dipping Technologies;* Apr. 6 & 7, 1989, pp. 1–15.

*Primary Examiner*—Paul J. Thibodeau
*Assistant Examiner*—D. Lawrence Tarazano
*Attorney, Agent, or Firm*—Christie, Parker & Hale, LLP

[57] ABSTRACT

Rubber articles are coated with a powder-free coating; the power-free/non-tacky coating comprises a copolymer formed by the sequential polymerization of two mixtures of monomers comprising styrene, alkyl acrylates, acrylic acid, methacrylic acid, and a silicone oligomer. The sequential polymerization of the two monomer mixtures produces a core copolymer surrounded by a shell copolymer, in which the two copolymers have differing glass transition temperatures.

1 Claim, 3 Drawing Sheets

FIG. 2

FIG. 3

ACRYLIC EMULSION COATINGS

CROSS REFERENCE TO RELATED APPLICATIONS

This application is a continuation-in-part of application Ser. No. 08/389,571 now pending filed Feb. 14, 1995

FIELD OF THE INVENTION

The invention relates to thin walled articles formed of natural or synthetic rubber having thereon a powder-free polymeric coating which enables or enhances mold or substrate stripping and donning.

BACKGROUND OF THE INVENTION

Rubber articles made from natural or synthetic rubber include surgeons gloves, physicians examining gloves, workers gloves, prophylactics, catheters, balloons, tubing, sheeting and the like. Some of such articles and in particular gloves require the ability of donning i.e. the ability of the rubber article to be slid on and off skin (tissue) surfaces without undue clinging or friction. Surgeons gloves require the wet donning, i.e., the ability to be slid over wet skin surfaces while physicians examining and workers gloves require the ability to be slid over dry skin surfaces. Other rubber articles like catheters and tubing, require some means to isolate the rubber from body fluids and tissue.

While this invention pertains to polymeric coatings for all rubber articles, it will focus on gloves which are the most complex of rubber articles in terms of use and manufacture.

To achieve acceptable donning properties, the rubber surface of a glove which comes in contact with skin or tissue has to be modified to reduce friction.

Surgeons gloves, as of today, require the donning surface to be sufficiently hydrophilic in order to absorb moisture that may be present on the surface of skin or tissue when the article is donned. Hydrogel coatings as described for instance in U.S. Pat. No. 3,813,695, incorporated herein by reference, have been employed to achieve this property.

Examination and other gloves, by contrast, do not have a hydrophilicity requirement but still require the ability of the rubber article to be slid over skin (tissue) surfaces with minimal drag or friction.

Traditionally, this had been achieved by applying talc or other powdered materials, such as modified corn starch, over the skin or tissue contacting surface. Talc can no longer be used and other powders can contaminate the field of work. The same applies for gloves used by workers in dust-free environments such as the manufacture of computer chips and other electronic articles.

Figure 1:
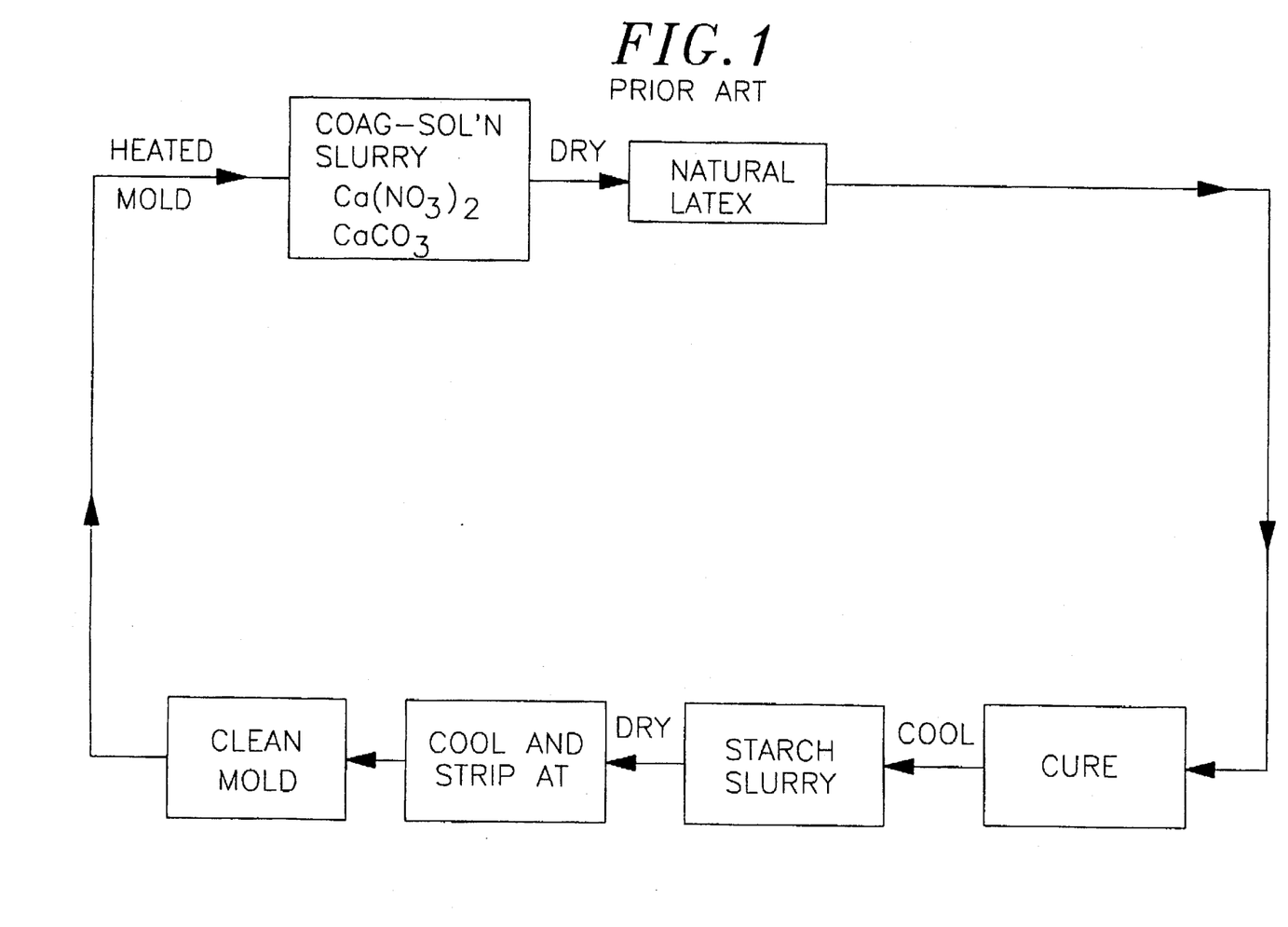
FIG. 1 is a flow diagram of the current method of rubber glove manufacture.

With reference to FIG. 1, the conventional way of manufacturing rubber gloves has been to dip a mold in the shape of the article to be formed in a coagulant slurry containing calcium nitrate and calcium carbonate. After drying, the mold is immersed in a rubber emulsion (latex) for a time sufficient for the rubber to coagulate and form a coating of desired thickness. The formed coagulated rubber article is oven cured, cooled, then dipped into a starch slurry. The starch coated surface is dried to provide a powder coat. After cooling, the rubber article is stripped from the mold. This turns the glove inside out. The mold is cleaned and recycled.

Water leaching may and usually is employed as part of the procedure to remove rubber impurities.

The methods and materials of glove manufacture are also described, for instance, in U.S. Pat. Nos. 3,411,982 and 3,286,011 to Kavalier et al., both incorporated herein by reference, "Polyurethane Latexes for Coagulation Dipping," Sadowski et al., Elastomerics, August 1979, pp. 17–20, incorporated herein by reference, and "Dipping with Natural Rubber Latex," Pendle et al., Natural Rubber Technical Bulletin, also incorporated herein by reference.

Halogenation, e.g. chlorination, and other chemical surface treatments have been used to eliminate the need for a powder coat on the final product to enable dry donning. While effective, this step is expensive and has the shortcoming of reducing shelf life of the rubber article. It would be desirable to provide a rubber article with a powder-free donning surface without resorting to the expensive and article deteriorating practices now in vogue. This could substantially reduce the cost of manufacture and maximize the shelf life of the rubber article.

U.S. Pat. No. 4,302,852 to Joung, incorporated herein by reference, proposed to covalently bond an RTV silicone coating to the interior surface of a rubber surgeons glove after formation of the glove. This is stated to reduce but not eliminate the need for a donning powder.

U.S. Pat. No. 4,304,008 also to Joung and incorporated herein by reference, applies a covalently bonded silicone or urethane to the outer surface of the glove and halogenates the inner surface. The halogenated inner surface eliminates the need for a donning powder.

U.S. Pat. No. 4,310,928, also to Joung and incorporated herein by reference, teaches the deposition of a lipo compound (lipid or lipophilic substances) in place of a powder of mineral origin in combination with a surfactant in a coagulant solution to form a uniform film on a glove mold onto which the rubber is coagulated. The lipo compound and surfactant enable stripping of a formed glove from its mold.

These and other proposals have not achieved commercial acceptance.

SUMMARY OF THE INVENTION

According to the present invention there are provided acrylic-based copolymers which coat and firmly adhere to and may, in part, be absorbed on the surface of a rubber article undergoing formation thereon by coagulation. The copolymers may also be deposited on a preformed rubber article. The copolymers, as to gloves and other rubber articles, are effective to induce the properties of mold stripping to the formed rubber article and donning without the need for further chemical treatment. Dry or wet donning and mold stripping properties may be achieved by depositing the same or a different acrylic based copolymer on opposed surfaces of the formed rubber article, e.g., gloves.

The acrylic based copolymers are preferably emulsion based copolymers of at least one reactive low surface energy monomer, preferably a silicone oligomer, at least one alkyl acrylate and at least one reactive hard monomer, the total of hard monomers being present in an amount sufficient to form a non-tacky copolymer directly or by blending of copolymers. Preferably the copolymers exhibited at least one dominant glass transition temperature (Tg) peak above 0° C. and typically at least one dominant glass transition temperature peak below about 0° C. One effective glass transition temperature is generally above about 15° C., preferably from about 15° to about 60° C. It is presently preferred that at least the donning surface be formed by sequential polymerization of two monomer systems; one providing the dominant low glass transition temperature peak, the other providing the dominant high glass transition temperature peak.

The presently preferred copolymers for release from a mold are copolymers comprising copolymerizable silicone oligomers, butyl acrylate, methyl acrylate, methacrylic acid, acrylic acid and styrene.

The presently preferred copolymers for dry and wet donning are copolymers comprising a silicone oligomer, styrene, butyl acrylate, methyl acrylate, acrylic acid, trimethylpropanetriacrylate and n-isobutoxymethyl acrylamide.

The emulsion copolymers are, for efficiency of the emulsion polymerization process, produced as high solids content emulsions. High solids are not required for product coating. Accordingly, the emulsions may be diluted to form a solids suspension containing from about 3 to about 10% by weight preferably about 6% by weight total of the acrylic based emulsion copolymer of a solids content typically employed for mold coating and for depositing a coating on the surface of a formed rubber article. In the alternative the acrylic based emulsion copolymer can be recovered from emulsion and later resuspended.

The suspension is used in combination with a water soluble multivalent metal salt which serves as a coagulant for the rubber emulsion. The coagulant may be deposited on the acrylic based copolymer or deposited therewith from suspension. The object is to provide a surface concentration of coagulant salt which will enable coagulation of the latex onto the deposited copolymer coat in a commercially acceptable time. The preferred coagulant salt is calcium nitrate and is used in a concentration up to about 40, preferably from about 20 to about 40 percent by weight of the suspension.

In article manufacture, in particular glove manufacture, the mold having a coagulant and polymer coated surface is immersed into a rubber emulsion or latex from which the rubber deposits and coagulates on the surface of the copolymer forming a coated interior glove surface. The formed rubber article is dried, cured, then immersed into an aqueous suspension of the same or a different acrylic based copolymer which exhibits good donning characteristics. Dipping forms a donning polymer coat on the exterior of the rubber glove. The formed coated glove is then stripped from the mold. This reverses the glove placing the donning coat on the interior of the glove. As is known, water leaching may be effectively employed for rubber purification.

In the practice of the invention the preferred mold is a contoured mold. While molds having a textured to highly polished ceramic or porcelain surface and molds having a fluorocarbon coating may be employed, it is preferred to employ a mold which is sufficiently textured to produce a dull finish in the deposited laminate formed by depositing the rubber from the latex onto the copolymer coating. This is achieved by roughening the mold surface by blasting with sand or glass beads. The surfaces used have been measured to have a roughness of from about 8 to 10 microns peak to valley.

It is preferred to use the same copolymer for the donning and release surfaces of the gloves with the donning side containing corn starch and a small amount of oil, i.e., about 0.1% by weight of solids.

The preferred copolymers have a surface friction which requires an average force of about 0.05 lb to less than about 0.3 lb, preferably about 0.2 to about 0.25 lb to move a sled weighing 200 g over the copolymer coated surface of the rubber article.

DETAILED DESCRIPTION

According to the present invention, there are provided non-tacky, acrylic based copolymers which adhere aggressively to the surface of rubber and other articles to provide flexible copolymeric coatings which can be stretched without separation from a rubber surface to which they are bonded. The copolymers are formed of at least one reactive low surface energy monomer, preferably one or more copolymerizable silicone oligomers, at least one alkyl acrylate and at least one hard monomer. The copolymers provide powder-free coated rubber products which exhibit excellent mold stripping and dry donning and provide protective coatings for other articles.

By the term "rubber article" as used herein, there is meant articles formed from natural and/or synthetic rubbers. They are typically deposited by coagulation from a latex onto a multivalent metal salt.

By the term "copolymerizable low surface energy monomer" there is meant monomers which if homopolymerized would require only a low level of force to release the homopolymer from a surface to which it was applied. In copolymers the copolymerizable low surface energy monomers reduce the energy to release the copolymers from a surface whether a mold, tissue or skin.

Exemplary of copolymerizable low surface energy monomers there may be mentioned reactive silicones, fluorocarbons, and fatty acid esters and the like, the low surface energy monomers having vinyl, acrylic and/or methacrylic functionalities. Preferred are copolymerizable silicone oligomers.

By the term "copolymerizable silicone oligomer," as used herein, there is meant polymeric siloxanes and silicones which have acrylate, methacrylate or vinyl functionality, including but not limited to acrylated polysiloxanes. Acrylate, methacrylate or vinyl functionality is at least 1, preferably from 2 to about 3.

Exemplary of the copolymerizable silicone oligomers there may be mentioned the Tegro® Silicone acrylates RC 149, 300, 450, 710, 720 and 802 and ZMR1395 manufactured and sold by Goldschmidt Chemical Corporation of Hopewell, Va., which polymers are linear dimethylpolysiloxanes with multiacrylate functionality and a molecular weight between about 1,000 and 20,000 g/mol. They include the reaction product of dimethylpolysiloxanes with pentaerythritoltriacrylate. There may also be mentioned silicone systems such as GE 6000, a vinyl polydimethyl siloxane and 6010 catalyst concentrate manufactured and sold by GE Silicones division of General Electric Company. Ethoxy-substituted polysiloxanes may also be used.

The copolymerizable low surface energy monomer(s) and preferably the copolymerizable silicone oligomer are employed in a concentration of from about 0.7 to about 20%, preferably about 1 to about 15% by weight of the monomers forming the acrylic based copolymer. They function to enable dry and wet donning and facilitate mold release.

The balance of the monomers are selected to provide good bonding to a latex surface, donning (wet and dry), a good tactile feel, mold release and a non-tacky copolymer having a significant glass transition temperature (Tg) of at least about 15° C., preferably from about 15° to about 60° C. The monomers are also selected to provide sufficient elongation so that the acrylic based copolymer coating will stretch or elongate with the rubber with minimal cracking, flaking or debonding. Suitable copolymers have an elongation of 100 to 500% or more, typically from about 100 to about 300% when self bonded to a rubber surface.

Of the rubber articles which can be manufactured in accordance with the instant invention, the articles and surgeons which have the most critical requirements are examination and surgeons gloves. Because of their complex shape, they must be capable of being stripped from a mold using commercially acceptable practices and yet provide, a surface, which when stripped from the mold, has good tactile feel; that is, the ability of a person to pick up articles with a good grip. In this regard, good tactile feel is contra to good mold stripping.

The opposed surface of the glove must enable good (dry or wet) donning, that is the ability to be stretched and slid over the surface of skin without excessive resistance.

The tactile and mold release surface may be glassy and smooth but is preferably rough and dull as induced by a textured or roughened mold. The donning surface normally requires a more course or irregular (dull) surface.

In respect of glove manufacture, copolymers of the instant invention provide good mold stripping and/or donning properties.

In addition to the low surface energy monomers, the following monomers and combination thereof can be used in accordance to the invention to provide suitable polymers having good donning and/or stripping characteristics.

One class of the monomers used in forming the copolymers are alkyl acrylate monomers containing from 1 to about 10 carbon atoms in the alkyl group, present in a total amount of from about 30 to about 85% by weight of the monomers, preferably from about 40 to about 85% by weight of the monomers forming the acrylic based copolymers. The alkyl acrylate monomers that may be used include methyl acrylate, ethyl acrylate, butyl acrylate, propyl acrylate, 2-ethylhexyl acrylate, isooctyl acrylate, isodecyl acrylate, and the like. The presently preferred alkyl acrylate monomers are butyl acrylate and methyl acrylate.

The balance of the monomer system is comprised of hard monomers. As used herein, "hard monomers" are monomers which, if homopolymerized, would have glass transition temperature (Tg) greater than about 25° C. Hard monomer content is from about 20 to about 60% by weight of the monomers forming the acrylic based copolymer.

Among such monomers there may be mentioned styrenic monomers such a styrene, alpha methyl styrene and the like; alkyl methacrylates such as methyl methacrylate, ethyl methacrylate, butyl methacrylate and the like; and amides such as an n-isobutoxymethyl acrylamide and the like.

There may be present and preferably are present one or more unsaturated carboxylic acids containing from 3 to about 5 carbon atoms, such as acrylic acid, methacrylic acid, itaconic acid and the like. They serve to improve cohesive strength and promote adhesion to rubber and other surfaces and are present in a concentration of from about 1 to about 6% by weight preferably from about 2 to about 6% by weight of the emulsion copolymer.

Other vinyl unsaturated monomers which aggressively copolymerize with the principal monomers of the invention and do not create a residual monomer contamination problem may also be used to modify polymer properties.

Such monomers include one or more vinyl esters containing from 2 to about 16 carbon atoms in the alkyl group of the acid. Representative vinyl esters include vinyl acetate, vinyl butyrate, vinyl propionate, vinyl isobutyrate, vinyl valerate, vinyl versitate, and the like.

Other useful monomers there may be mentioned diesters of dicarboxylic acids and mixtures thereof, in which each ester group of the diester independently contains from about 8 to about 16, preferably from about 8 to about 12, carbon atoms. The preferred diesters are di-2-ethylhexyl maleate (dioctyl maleate), di-2-ethylhexyl fumarate and mixtures thereof.

The emulsion copolymers may be prepared in accordance with the present invention bypolymerizing the monomers to yield a polymer having a suitable average or net glass transition temperature (Tg) above about 15° C., preferably from about 15° C. to about 60° C., and a solids content ranging from about 40 to about 70% by weight of the emulsion. Catalysts, such as potassium persulfate, tertiary butyl hydroperoxide and the like, and Redox catalysts such as sodium meta-bisulfite and the like, present in an amount of from about 0.15 to about 0.5 part by weight per 100 parts weight monomers with surfactant levels ranging from about 0.5 to about 5% by weight based on weight of the monomers being preferred. Reaction temperature generally ranges from about 65° to about 85° C.

There may be included "chain transfer agents" by which there is meant organic compounds containing mono- or multi-mercaptan groups, chlorinated groups, hydroxy groups, and the like, as are known in the art. The presently preferred chain transfer agents are n-dodecyl mercaptan and t-dodecyl mercaptan provided in a concentration from about 0.01 to about 0.1% by weight of the monomers. In addition, internal cross linking may be induced by the use of multifunctional acrylates and methacrylates.

While the copolymers prepared in accordance with the instant invention can be used for a variety of rubber article applications, including gloves, catheters, tubing, protective coverings, prophylactics, and the like, the primary focus is their use in the manufacture of powder-free gloves and other articles.

With reference again to FIG. 1, a mold in a contoured shape of a glove is coated with an acrylic based copolymer of this invention which exhibits good mold stripping properties. The copolymer coating is preferably applied from suspension in combination with a coagulating electrolyte. The steps of copolymer coating onto a mold for transfer to a latex rubber replaces the step of depositing a slurry of calcium carbonate on the mold surface while depositing the copolymer on a formed article replaces coating the article with a starch slurry. The copolymer is applied from suspension. The article is formed by deposition onto a coagulating salt such as calcium nitrate provided on a mold, on a copolymer coating on the mold or codeposited with the copolymer. For gloves, the copolymer coated mold providing a coagulant salt surface, preferably codeposited with the copolymer, is emersed into a rubber latex which coagulates onto the surface of the mold providing shape to the rubber article, dried, cured and then immersed into a second suspension of the same or another acrylic based copolymer which exhibits excellent donning properties i.e. the ability to be slid over a skin surface with minimal friction and blocking. Leaching is employed as in the prior art either before or after cure or prior to after providing a donning coat. The formed article is then stripped from the mold. The mold is cleaned and recycled. Stripping turns the glove inside out causing the donning surface to be on the inside of the glove and the mold stripping surface to be outside of the glove.

For glove manufacture, it is presently preferred to use a roughened mold as formed by blasting with sand or glass beads to provide a toughened surface which as been measured as having a roughness of about 8 to 10 microns peak to valley. Other textures may also be used.

The emulsion copolymers of the instant invention may be used as such or combined with inert granular solids such as calcium carbonate, starch and the like provided to enhance donning. Inert solids content may range in an amount based on total solids weight of from about 3 to about 10% by weight of solids. It is presently preferred to employ corn starch in an amount of from about 0.3 to about 0.7, more preferably from about 0.3 to about 0.5 part per part by weight copolymer. A suitable corn starch is 400 L-NF corn starch made by Roquetle America, Inc., Keokuk, Iowa. The donning coat also preferably contains a small amount, about 0.1% by weight copolymer, of an oil such as octyl isononanoate or Neobee M-20, a polyol diester of a short cleaned fatty acid manufactured by Stepan Chemical Co., Northfield, Ill.

It has been found that for good donning and stripping properties, each of the copolymer coatings are preferably formed of at least a two polymers. One is a copolymer having a low glass transition temperature, and the other a copolymer having a high glass transition temperature. The two, in combination, provide a non-tacky copolymer having at least one significant glass transition temperature of about 15° C. or more and preferably in a range of about 15° to about 60° C.

While this may be achieved by using a blend of polymers, it is preferably achieved by sequential or "core and shell" polymerization of at least two monomer systems, the first forming an acrylic based copolymer having a glass transition temperature of less than about 25° C., typically from about −50° to about 25° C.; the other forming an acrylic based copolymer having a glass transition temperature of from about 25° to about 100° C., the first and second monomer systems providing no tacky copolymer coating systems. It has been observed that for a copolymer exhibiting good mold release, the copolymer having glass transition temperatures below 0° C. occupies the bulk of the total glass transition temperatures. The opposite may be true for a donning copolymer.

Figure 2:
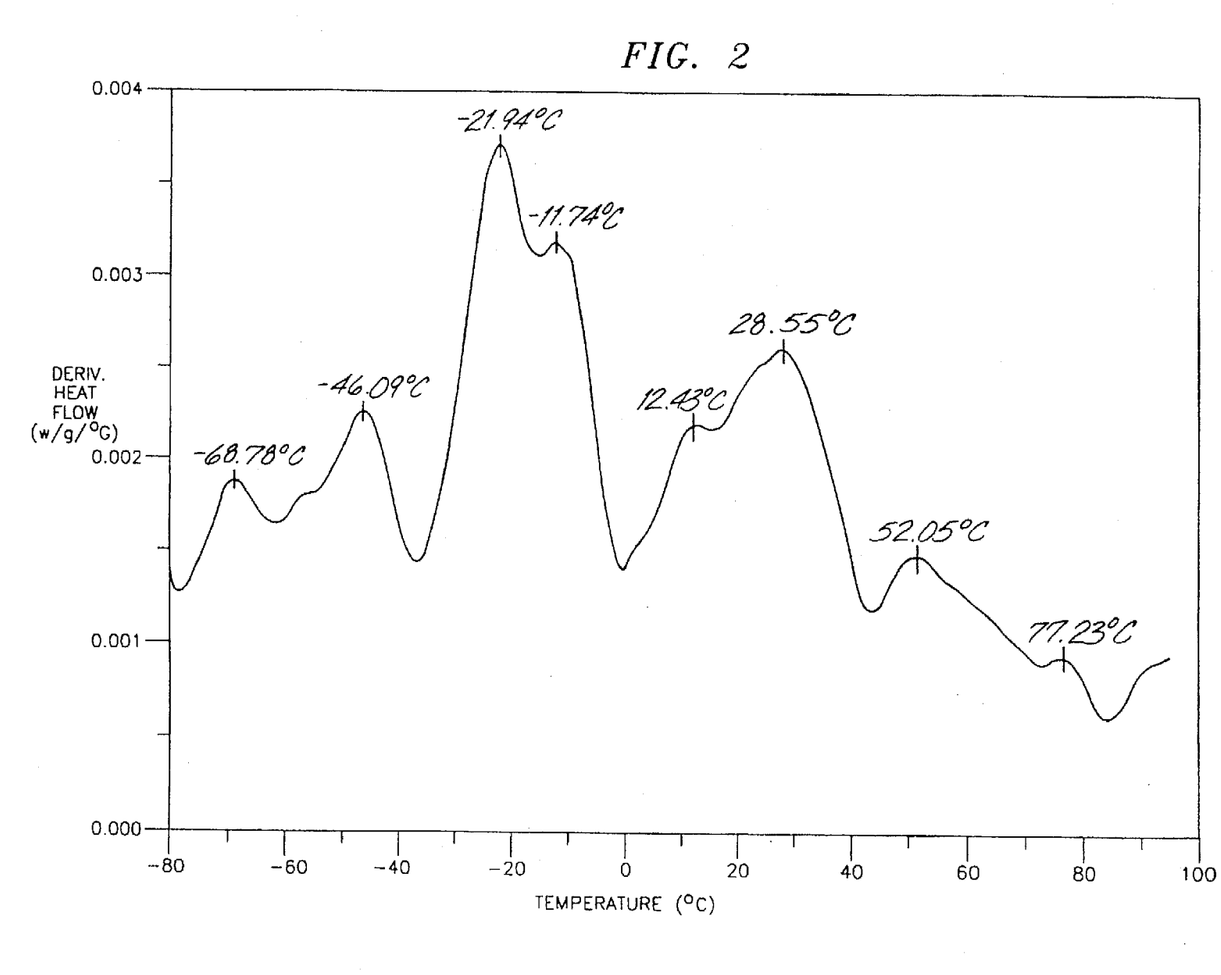
FIG. 2 is a Differential Scanning Calorimetry (DSC) plot of derivative of heat flow vs. temperature showing glass transition temperature peaks for the preferred mold release copolymer coating of the invention.

In particular, FIG. 2 is a plot of glass transition temperature of a sequential polymerized mixture of copolymers with a major glass transition temperature peak below 0° C. and a minor glass transition temperature peak above 0° C. for use as a mold release copolymer coating. While, not bound by theory in this "core and shell" approach to sequential polymerization of two monomer systems, it is believed there is formed a continuous phase of the low glass transition temperature copolymer having dispersed therein or thereon, the high glass transition temperature copolymer.

Figure 3:
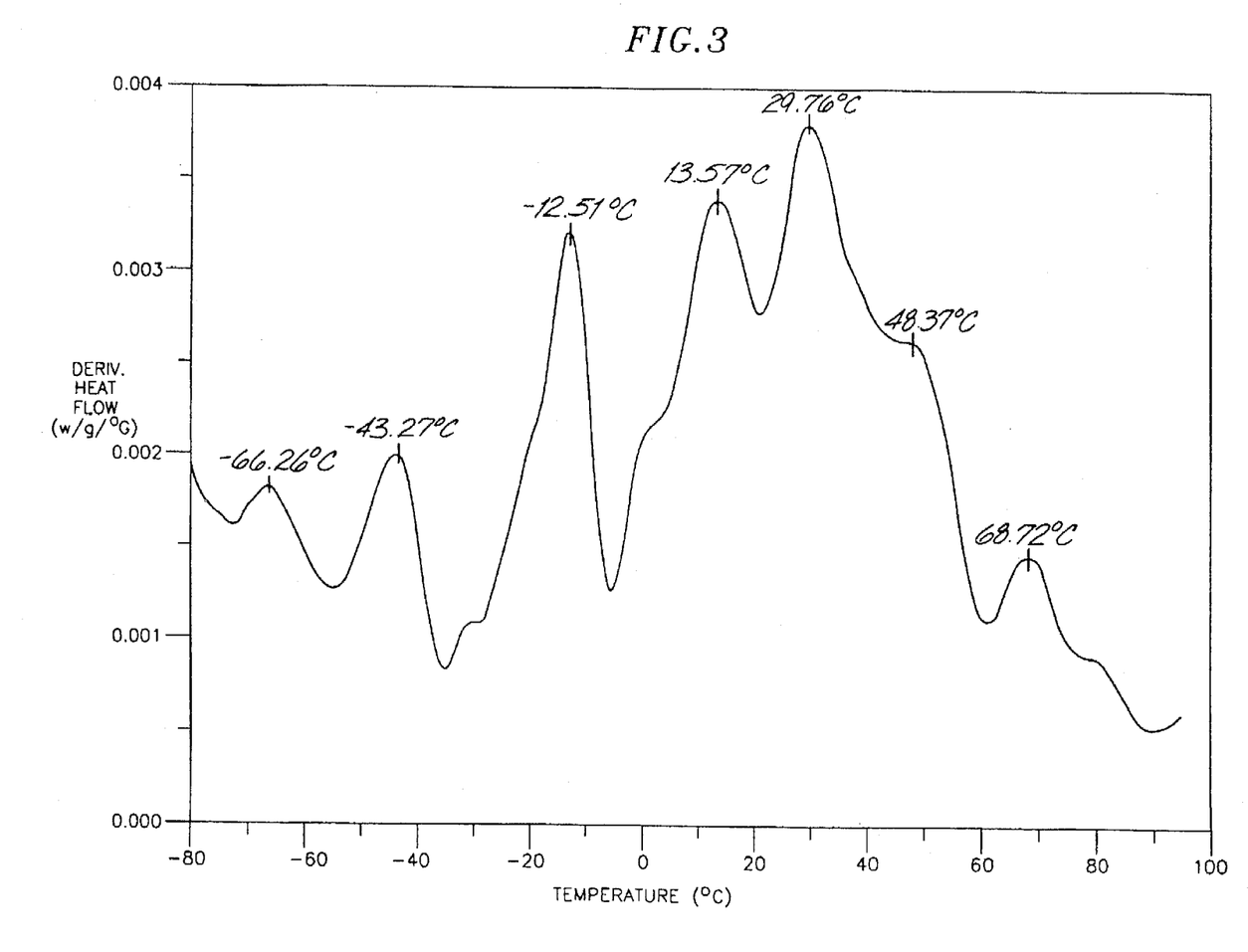
FIG. 3 is a Differential Scanning Calorimetry plot of derivative of heat flow as function of temperature showing glass transition temperature peaks for the preferred donning copolymers of the invention.

FIG. 3 is a glass transition temperature plot for a good donning copolymer coating where relative peak intensities of glass transition temperature are reversed.

For good mold release characteristics, it is presently preferred that weight ratio of the soft or low glass transition temperature copolymer to high glass transition temperature copolymer be in the range of about 1:1, to about 1:3, preferably about 1 to 1.5.

For good donning characteristics, the weight ratio of low to high glass transition temperature copolymers is in the range of about 3:1, to about 1:1, preferably about 1.2 to 1.

It has been observed that if too much high Tg copolymer is present, flaking will occur. In addition, for good dry donning, it is desirable that the copolymer form as domains or microparticles. This provides in essence, a rough surface which is desirable for good donning and fillers such as calcium chloride may be included in the suspension. If too much low glass transition temperature copolymer is employed, there is a problem of sticking or blocking.

As indicated above, for the process of copolymer manufacture it is desirable to employ a surfactant system present in the amount of from about 0.5 to about 5 parts by weight to 100 parts by weight monomers, preferably about 3 parts per 100 parts by weight monomers. It is also desirable that the suspension formed from the emulsion copolymer tolerate electrolytes typically employed for latex coagulation in concentration typically used for latex coagulation, i.e., in the range of about 3 to about 10% by weight of suspension. The presently preferred surfactant system is a combination of anionic surfactants. One of the anionic surfactants has a molecular formula $C_{20}H_{37}O_7NaS$ and containing 20 mols of ethylene oxide and is used in admixture with anionic surfactants which are salts of sulfated nonyl phenoxypoly (ethyleneoxy) ethanol and sodium lauryl ether sulfate. The presently preferred surfactant system is one employing 37.4% by weight of the ammonia salt of sulfated nonylphenoxypoly (ethyleneoxy) ethanol, 21.8% by weight of sodium dioctyl sulfosuccinate and 40.8% by weight sodium lauryl ether sulfate. The combination of anionic surfactants enables the formation of a stable suspension of the acrylic based emulsion copolymers of the invention.

The emulsion copolymers of the instant invention can be prepared to provide both a high cohesive strength and holding power to natural and synthetic rubber surfaces as well as the ability to stretch with the rubber surfaces and enable donning. The copolymers have an elongation of 100 to 500%, preferably 100 to 300% when adhered to rubber and a mean coefficient of friction from about 0.05 to about 0.3 lb typically from about 0.2 to about 0.25 lb. Copolymer coating thickness is from about 10 to about 25 microns, preferably from about 12 to 16 microns.

The inclusion of multifunctional monomers such as tetramethylpropane triacrylate and the like, which undergo cross linking reactions and chain transfer agents as part of the monomer system results in formation of internally cross-linked emulsion polymers. This differs from externally cross-linked polymer in that the functional groups, such as carboxyl, hydroxyl, and/or amino groups, remain free and available for improving bonding and are available for external cross-linking reactions such as by exposure to actinic, electron beam radiation and/or through external cross-linking agents.

The emulsion polymers can be used as such or modified by the addition of vinyl-addition silicone polymers present in an amount up to about 30% by weight based on the weight of the emulsion polymer and vinyl-addition silicone system. The vinyl-addition silicone systems used are those which comprise silicone monomers having vinyl unsaturation which, when mixed with silicone hydride containing crosslinkers, is cured by a Group VIII metal catalyst, preferably a platinum catalyst.

The presently preferred vinyl-addition silicone emulsions are mixtures of reactive vinyl silicone polymers of the formulas:

where m and n are independent integers, and silicone hydride crosslinking polymers of the formula;

where m and p are independent integers.

There may also be included conventional ingredients designed to modify mold release properties.

Vinyl-addition silicone systems react by thermally induced addition-cure (hydrosilation) between polydimethyl-hydrogen siloxane crosslinkers and reactive vinyl-functional silicone polymers to furnish a cured polymer.

The vinyl-functional silicone polymers are polydimethyl siloxanes, where some of the methyl groups have been substituted with vinyl groups or groups containing vinyl unsaturation, i.e., the reaction takes place between vinyl substituted polydimethyl siloxane and polydimethylhydrogen siloxane.

The whole hydrosilation is catalyzed by silicone soluble complex compounds of Group VIII transition metals, particularly platinum. In normal use of vinyl-addition silicone systems, a small amount of inhibitor is added to prevent premature reaction between the silicone hydride and vinyl silicone groups following mixing of the coating components, before deposition onto the substrate. This inhibitor is removed or made ineffectual during the thermal curing process. Suitable silicone emulsion systems for practice of this invention can be obtained from Dow Corning, Rhone-Poulenc and Wacker-Chemie GmbH, e.g., the Wacker VP 1571E/1572 System.

Emulsion copolymers of the instant invention are formed to high solids content during emulsion polymerization for efficiency of the emulsion polymerization process. They are normally diluted to form a suspension having a less solids content for use coating onto a mold for the rubber article to be formed or onto the formed rubber article. As is known in the art typical solids content is in the range of about 3 to about 10% by weight of suspension.

A coagulant salt is required to cause the rubber to deposit from its emulsion (latex) onto a surface of the polymer. The coagulant may be applied after drying of the copolymer on the surface of the mold, a considerable savings in time and cost can be realized by combining a coagulant with the copolymer suspension. It has surprisingly been found that the copolymer suspensions of the instant invention can tolerate the high amount of polyvalent metal salts which serve as a coagulant if the multi-component anionic surfactant system is employed. Examples of coagulants that can be used are water soluble salts of calcium, zinc, aluminum and the like. Calcium nitrate is presently preferred. A coagulant salts, preferably calcium nitrate, is normally provided in a concentration of up to about 40% by weight of the suspension typically from about 20 to about 40% by weight of suspension for mold coating. Combining the coagulant with the emulsion polymers of the instant invention eliminates a significant step in the production of copolymer coated rubber articles. If the copolymer is applied without coagulant, then the coagulant is applied to the surface of the copolymer after the copolymer has been deposited and dried on the surface of the mold. This adds a step and is, therefore, a more expensive measure.

The presently preferred molds are smooth contoured molds having a textured, or smooth ceramic, porcelain or a fluorocarbon surface which will accept the coating of the copolymer or the copolymer and coagulant and release the formed rubber article at the completion of the process.

The amount of time of immersion in the rubber emulsion determines the thickness of the formed rubber coat. A typical thickness is from about 6 to about 10 mils.

After removal, the coagulated rubber articles may be allowed to stand or heat dried in an oven. The formed rubber article is then leached in water. The leached rubber coating is then cured.

After cure, the rubber coated copolymer is allowed to cool to about 60° to 80° C. and then dipped into a second acrylic based emulsion copolymer suspension preferably free of coagulant to avoid the waste of salt by need for another leaching step. Immersion is for about 3 to about 6 seconds. The coating is dried at about 100° to 125° C. for about 2 to 3 minutes.

The double coated article is then cooled to about 40° C. and stripped from the mold. Because stripping turns the glove inside out, the second coating becomes the donning coating for contact with tissue or skin while the exterior or outside coating which was the stripping coating becomes the tactile coating.

While the focus of the discussion has been directed to copolymer coatings for rubber articles and in particular gloves, the copolymers have been found to have other utilities, and in particular, coatings for what is known as "soft touch" products for use in the automobile industry. An example is to provide polymeric laminates having a leather look with a feel to match.

The copolymers of the instant invention have been successfully evaluated for use in vacuum formable laminates. The product construction would consist of a polyester film acting as a carrier which is removed prior to vacuum forming. The copolymers of the instant invention are deposited on the carrier at about 0.25 to about 2 mils in thickness to save as a clear or pigmented top coat and as the surface that is felt by the user. The balance consists of material deposited to give the appearance of leather, wood grain or the like, as the layer of the copolymer of the instant invention adds or insures the "soft touch". There is then added a layer of heat activated adhesive followed by heat and pressure bonding to a 20 mil sheet of polymeric material compatible with the injection molding plastic. The polyester carrier is then removed and the laminate is vacuum formed and insert molded to give a contoured plastic part with a unique and desirable soft feel.

The copolymers of the instant invention could also be used as a spray coating or could be deposited on a backing having a pressure-sensitive adhesive on the opposite side. The copolymers provide protective and unusual "soft touch" performance properties. In either application, the polymer is believed to have unusual exterior performance properties due to containing silicone and acrylic monomers.

EXAMPLE 1

Emulsion Copolymer for Mold Stripping

There was formed on a parts by weight basis a first soap solution of 98.2 parts by weight deionized water, 0.87 parts tetrasodium pyrophosphate 10.9 parts by weight Aerosol™ NPES 458, a 58% solution of the ammonium salt of sulfated nonylpoly (ethyleneoxy) ethanol manufactured by Cyanamid, 4.9 parts Aerosol™ OT 75, a 75% solution of sodium dioctyl sulfonate and 3 parts Disponil FE S77 a 32.5% solution of sodium lauryl ether sulfate manufactured by Henkel and, a second soap solution containing 82.2 parts deionized water, 0.73 parts tetrasodium pyrophosphate, 9.1 parts NPES 450, 4.1 parts OT 75 and 17.8 parts FES 77 surfactants.

There were formed two separate monomer systems. The first monomer system contained 39.6 parts styrene, 318 parts butyl acrylate, 50 parts methyl acrylate, 3.8 parts methacrylic acid, 3.8 parts acrylic acid, 71.3 parts RC 726, a silicone acrylate manufactured and sold by Goldschmidt, 30 parts GE silicone SL 6000-D1 and 23.5 parts GE silicone SL 6010-D1.

The second monomer system contained 210 parts styrene, and 102.9 parts butyl acrylate, 43.9 parts methyl acrylate, 3 parts methacrylic acid, 2.7 parts acrylic acid, and 56 parts GE silicone SL 6000-D1.

There was separately formed a catalyst solution containing 78 parts of deionized water and 2 parts potassium persulfate, and an activator solution containing 78.5 parts by weight deionized water and 1.5 parts of sodium metabisulfite. There was formed an initial reactor charge containing 320 parts deionized water, 0.08 parts of NPES 458, 4.5 parts of sodium bicarbonate and 3.85 parts potassium persulfate and 0.15 parts sodium meta-bisulfate. To the initial reactor charge there was slowly added, with agitation, the mixture of the first monomers in the first soap solution followed by incremental addition of the activator solution then incremental addition of the catalyst. Reactor temperature was maintained between 65° and 73° C. Following completion of the reaction there was added the second soap solution containing the second charge of monomers incrementally. After completion of reaction were treated with an ammonium and biocide, solutions water. The emulsion had a pH of 8.7 and a solids content of 57%.

EXAMPLE 2

Emulsion Copolymer for Dry Donning

A procedure of Example 1 was substantially repeated except that the monomers for the first charge were in proportion of 95 parts styrene, 220.7 parts butyl acrylate, 38.8 parts methyl acrylate, 9.8 parts acrylic acid, 15 parts GE SL 6000-D1, 9 parts trimethylpropane-triacrylate and 3.3 parts n-isobutoxymethylacrylamide.

For the second monomer charge, there was employed a monomer mix of 302.3 parts styrene, 146.2 parts butyl acrylate, 57.9 parts methyl acrylate, 17.5 parts acrylic acid, 40.4 parts GE SL 6000-D1, 20 parts trimethylpropane triacrylate and 4.48 parts N-isobutoxymethyl acrylamide, the incremental catalyst solution contained 70.5 parts deionized water, and 2.5 parts of potassium persulfate. To the first soap solution contained 6.91 parts NPES 458, 3.3 parts OT 75 and 14.7 parts FES 77 and the first monomers were added a to the initial reactor charge followed by incremental addition of the catalyst solution and after completion of reaction, there was incrementally added second monomer system in a soap solution containing 4.9 parts OT-75, 10.29 parts NPES 458 and 21.89 parts FES 77. Temperature was maintained at 78° to 85° C. and after treatment with the ammonium biocide solution, the emulsion had a pH of 6.6 and a total solid content of 57.6%.

EXAMPLE 3

Glove Manufacture

The copolymer of Example 1 and calcium nitrate as a coagulant were coated onto a mold for an examination glove. The coated mold was immersed into a latex solution and allowed to remain in the solution until a coat of 6 to 10 mils built up on the coating. The coating was then immersed in a solids suspension of the copolymer of Example 2. After drying the coating of the copolymer of Example 2, the glove was stripped from the mold.

The glove formed was fisheye free and had a shiny outside of post cure coating of the copolymer of Example 1 and a dull side of the coating of the copolymer of Example 2. The copolymers of Examples 1 and 2 were strongly bonded to the latex and the formed glove had excellent dry and wet donning properties for use as an examination glove. No flaking occurred when the glove was stretched. FIG. 3 shows the DSC profile for the copolymer with major glass transitive temperature peaks at −21.04° C., 11.74° C. +12.45° and +28.55° C. Surface morphology revealed a slightly irregular continuous surface with microcraters and submicron protrusions, the microcrater diameters ranging from 0.1 to 1 μ. FIG. 4 shows the DSC plot for this polymer and the several glass transition peaks, the major ones being at −12.51° C., 13.57° C. and 29.76° C. Morphology studies revealed a slightly irregular surface with submicron protrusions, shallow submicron craters and agglomerated particle protrusions and microcraters.

EXAMPLE 4

Emulsion Copolymer for Dry Donning

There was formed a surfactant solution comprising, on a parts by weight basis, 122.70 parts deionized water, 1.60 parts tetrasodium pyrophosphate (0.96 parts dry), 31.27 parts surfactant (21.56 parts dry).

There was separately formed a monomer mixture containing on a parts by weight base is 100 parts styrene, 405.12 parts butyl acrylate, 37.42 parts methyl acrylate, 6.5 parts methacrylic acid, 12.30 parts acrylic acid, 6.25 parts RC 705, a silicone acrylate sold by Goldschmidt and 0.08 parts n-dodecyl mercaptan. The monomer mixture was added to the surfactant solution in a weight ratio of 4 parts monomer to 1 part surfactant solution.

There was separately formed an incremental catalyst solution of 63 parts by weight deionized water and 2 parts by weight potassium persulfate as well as a minor amount of surfactant.

To a stirred, nitrogen blanketed reactor, following the charge of 200 parts by weight deionized water,. 3.08 parts by weight surfactant and 1.5 parts potassium persulfate, there was incrementally added the monomers and surfactant solution with the catalyst solution at a rate to enable a reaction to be carried out with a slight exotherm. Temperature was kept at 80°±2° C. There was formed an emulsion having a total solids content of about 54.3%. The emulsion was then adjusted to a pH of about 6.5 with a biocide/ammonia neutralizing solution.

EXAMPLE 5

Emulsion Copolymer for Dry Donning

Example 4 was substantially repeated except that the monomer mixture contained on a parts by weight based 219.2 parts methyl methacrylate, 219.2 parts butyl acrylate, 51.33 parts methacrylic acid, 13 parts n-isobutylmethacrylate, 16.66 parts silicone acrylate (RC 705), and 0.13 parts n-dodecyl mercaptan and the surfactant solution was formed of 27.73 parts Aerosol NPES 930, 2.7 parts OT-75 and 24.9 parts FES-77 and contained 0.66 parts sodium metabisulfite and 18.81 parts surfactant in 113.3 parts deionized water.

EXAMPLE 6

Glove Manufacture

The emulsion copolymer of Example 5 was evaluated as a 4.8% solids suspension contains 4.5% soap. It was used to coat a washed examination glove. The deposited coat gave very good dry donning and stripping characteristics. No flaking occurred.

EXAMPLE 7

Dry Donning Copolymer and Glove Manufacture

Following the procedure of Example 4, there was formed a copolymer containing 46.4% by weight styrene, 38% by weight butyl alkylate, 1.3% by weight methacrylic acid, 3.3% by weight acrylic acid, 8.5% by weight silicone acrylate, and 1.9% isobutoxymethyl acrylamide. The formed copolymer was combined with, by weight of the copolymer; of 0.6% vegetable oil and providing a good donning copolymer for glove manufacture.

EXAMPLE 8

Dry Donning Copolymers and Glove Manufacture

There was formed a blend of copolymers in a weight ratio of 1:3 of the copolymer of Example 5 and a copolymer obtained by emulsion polymerization of 48.2% by weight styrene, 33.1% by weight butyl acrylate, 6.1% by weight methyl acrylate, 1.1% by weight methacrylic acid, 2.1% by weight acrylic acid, 6.3% by weight silicone acrylate, 0.9% by weight n-isobutoxymethyl acrylamide and 2.3% by weight trimethylpropane triacrylate. The blend of polymers was deposited onto a mold. Calcium nitrate was the coagulant. The procedure of Example 3 was used to form a coating of the latex on the copolymer.

EXAMPLE 9

Dry Donning copolymer and Glove Manufacture

There was formed an emulsion copolymer from a monomer mix containing 43% by weight styrene, 36.5% by weight butyl acrylate, 8.6% by weight methyl acrylate, 1% by weight methacrylic acid, 1.9% by weight acrylic acid, 5.2% by weight silicone acrylate, 0.8% by weight n-isobutoxymethyl acrylamide and 3% by weight trimethylpropane triacrylate. A suspension of the copolymer which was coated onto medium and large glove molds, onto which there was formed using the procedure of Example 3, a rubber coat.

EXAMPLE 10

Frictional Measurements

For purposes of determining surface friction of the copolymer coating, there were prepared samples 1" wide, over which there was drawn at a crosshead speed of 15 inches per minute a 200 g sled containing three glass balls having a diameter of ⅝ positioned at the corners of an equilateral triangle. A force of about 0.112 lb. of resistance was required to draw of the sled over a powdered surface. The force was 0.07 lb for a chlorinated surface and a biogel surface. By contrast, untreated surfaces gave a resistance of about 0.33 and 0.34 lb with a tendency to lift from the surface onto which they were applied with a considerable tendency toward jerky movement. The composition of Example 7 required a force of about 0.22 lb. The blend of polymers of Example 8 required a force of about 0.23 lb and the composition of Example 9, when deposited from a 6% solids suspension, required a force of about 0.22 lb. Resistance increased to about 0.225 lb. at an 8% solids concentration. Measurements were made under conditions of 50% humidity and a temperature of 23° C.

EXAMPLE 11

Emulsion Copolymer for Protective Coating

A procedure of Example 1 was substantially repeated except that the monomers for the first charge were in proportion of 150 parts styrene, 237 parts butyl acrylate, 22 parts acrylic acid, 31 parts RC 726, 9 parts methacrylic acid triacrylate and 8.7 parts N-isobutoxymethylacrylamide.

For the second monomer charge, there was employed a monomer mix of 348 parts styrene, 136.6 parts butyl acrylate, 9 parts methylacrylic acid, 248 parts acrylic acid, 30.8 parts RC 726, 8.7 parts N-isobutoxymethyl acrylamide, the incremental catalyst solution contained 70.5 parts deionized water, and 2.5 parts of potassium persulfate. There was formed by sequential emulation polymerization emulsion of the copolymers which a total solid content of 53.3. The formed copolymers provided aggressive protective coatings for rubber surfaces.

EXAMPLE 12

Donning Coating

The aqueous solution of the emulsion copolymer of Example 1 was combined with calcium carbonate present in an amount of about 3.3% by weight of the emulsion as formed which there was added water and a minor amount of propylene glycol dicaprylate. The mixture formed an excellent composition for providing a wet and dry donning surface in a glove.

EXAMPLE 13

Example 12 was repeated except that starch was substituted for calcium carbonate. Again the coating had excellent dry and wet donning properties.

What is claimed is:

1. A mixture of copolymers formed for use as coating for rubber articles said mixture comprising a first emulsion copolymer which is the reaction product formed by copolymerizing a first monomer mixture comprising styrene, butyl acrylate, methyl acrylate, methacrylic acid, acrylic acid and at least one copolymerizable silicone oligomer in emulsion, said first emulsion copolymer having a glass transition temperature less than about 0° C. and a second emulsion copolymer which is the reaction product of a second monomer mixture comprised of styrene, butyl acrylate, methylacrylate, methacrylic acid, acrylic acid and at least one copolymerizable silicone oligomer, said second emulsion copolymer having a glass transition temperature of from about 0° C. to about 100° C., said mixture of first and second acrylic based emulsion copolymers being formed by sequential emulsion polymerization in the presence of at least two anionic surfactants and when deposited from suspension on a rubber article form when dry a non-tacky coating.

* * * * *

UNITED STATES PATENT AND TRADEMARK OFFICE
CERTIFICATE OF CORRECTION

PATENT NO. : 5,712,346
DATED : January 27, 1998
INVENTOR(S) : Ivan Lee

It is certified that error appears in the above-indentified patent and that said Letters Patent is hereby corrected as shown below:

Abstract, line 2, replace "power-free" with -- powder-free --.
Column 5, line 31,32, replace "in accordance to" with
      -- in accordance with --.
Column 5, line 52, replace "a styrene" with -- as styrene --.
Column 6, line 14, replace "bypolymerizing" with -- by polymerizing --.
Column 7, line 6, replace "toughened" with -- roughened --.
Column 7, line 6, replace "as" with -- has --.
Column 7, line 25, after " at least" delete "a".
Column 9, line 62, replace "salts" with -- salt --.
Column 11, line 35, replace "were treated" with -- and treatment --.
Column 11, line 36, replace "biocide, solutions water. The" with
      -- biocide solution, the --.
Column 11, line 54, after "added" delete "a".
Column 12, line 14, replace "-21:04°C." with -- -21.04°C.--.
Column 12, line 30, replace "base is" with -- basis --.
Column 12, line 42, after "water," delete the period.
Column 12, line 54, replace "based" with -- basis --.
Column 12, line 67, replace "contains" with -- containing --.
Column 13, line 13, replace "copolymer;" with -- copolymer, --.
Column 13, line 14, before "0.6%" delete "of ".
Column 13, line 55, after "draw" delete "of".

UNITED STATES PATENT AND TRADEMARK OFFICE
CERTIFICATE OF CORRECTION

PATENT NO. : 5,712,346
DATED : January 27, 1998
INVENTOR(S) : Ivan Lee

It is certified that error appears in the above-indentified patent and that said Letters Patent is hereby corrected as shown below:

Column 14, line 22, replace "copolymers which" with -- copolymers with --.
Column 14, line 32, after "formed" insert -- to --.

Signed and Sealed this

Twenty-third Day of March, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,712,346
DATED : Jan. 27, 1998
INVENTOR(S) : Ivan Lee

It is certified that error appears in the above-identified patent and that said Letters Patent is hereby corrected as shown below:

On the title page,

Item 56, Refs. Cited, under "OTHER PUBLICATIONS" insert the following reference:
-- T. D. Pendle and A.D.T. Gorton; *Dipping with Natural Rubber Latex;* pp. 1-12. --.

Signed and Sealed this

Eleventh Day of May, 1999

Attest:

Q. TODD DICKINSON

*Attesting Officer*     Acting Commissioner of Patents and Trademarks